US009641682B2

(12) United States Patent
Konigsberg et al.

(10) Patent No.: US 9,641,682 B2
(45) Date of Patent: May 2, 2017

(54) MARKETING CHANNEL SELECTION ON AN INDIVIDUAL RECIPIENT BASIS

(71) Applicant: International Business Machines Corporation, Armonk, NY (US)

(72) Inventors: Paul B. Konigsberg, Sudbury, MA (US); Shaochun Zhu, Lexington, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/711,694

(22) Filed: May 13, 2015

(65) Prior Publication Data

US 2016/0337520 A1  Nov. 17, 2016

(51) Int. Cl.
*H04M 3/00* (2006.01)
*H04M 5/00* (2006.01)
*G06Q 30/00* (2012.01)
*H04M 3/51* (2006.01)

(52) U.S. Cl.
CPC .................................. *H04M 3/5191* (2013.01)

(58) Field of Classification Search
CPC ............... G06Q 30/02; G06Q 30/0251; G06Q 30/0254; G06Q 30/0259; G06Q 30/0261; G06Q 30/0269; G06Q 30/0277
USPC ........... 379/265.09; 705/14.73, 14.52, 14.13, 705/14.41
See application file for complete search history.

(56) References Cited

U.S. PATENT DOCUMENTS

| 8,676,646 | B2 | 3/2014 | Crites et al. |
| 8,676,647 | B2 | 3/2014 | Crites et al. |
| 8,738,440 | B2 | 5/2014 | Crites et al. |
| 8,862,498 | B2 | 10/2014 | Crites et al. |
| 2005/0071223 | A1 | 3/2005 | Jain et al. |
| 2006/0047563 | A1 | 3/2006 | Wardell |
| 2007/0061190 | A1 | 3/2007 | Wardell |
| 2007/0233555 | A1 | 10/2007 | Fourrage |
| 2009/0222333 | A1 | 9/2009 | Rivas |
| 2011/0307327 | A1 | 12/2011 | Bixby et al. |
| 2011/0320395 | A1 | 12/2011 | Dada et al. |
| 2013/0232014 | A1* | 9/2013 | Judd .................. G06Q 30/0277 705/14.73 |
| 2013/0325596 | A1 | 12/2013 | Ouimet |
| 2014/0280651 | A1 | 9/2014 | Krugman et al. |

(Continued)

FOREIGN PATENT DOCUMENTS

CA  2825127  2/2014
WO  2006028739  3/2006

OTHER PUBLICATIONS

"Jep Java Introduction," Singular Systems, 2010, 2 pages.

*Primary Examiner* — Thjuan K Addy
(74) *Attorney, Agent, or Firm* — VanLeeuwen & VanLeeuwen; David B. Woycechowsky

(57) ABSTRACT

An approach is provided for selecting a telecommunications channel. In the approach, recipient attributes that correspond to an intended recipient are identified and current environment settings are retrieved. Predefined channel expression rules are then executed, with the channel expression rules utilizing the recipient attributes and the current environment settings as inputs to the rules. The execution of the channel expression rules results in the identification of a best telecommunications channel. A message is then transmitted to the intended recipient over the identified best telecommunications channel.

20 Claims, 6 Drawing Sheets

(56) References Cited

U.S. PATENT DOCUMENTS

2014/0365334 A1* 12/2014 Hurewitz ........... G06Q 30/0613
                                                    705/26.41
2015/0006297 A1   1/2015 Stark
2016/0063560 A1*  3/2016 Hameed ............. G06Q 30/0264
                                                    705/14.61

* cited by examiner

US 9,641,682 B2

MARKETING CHANNEL SELECTION ON AN INDIVIDUAL RECIPIENT BASIS

BACKGROUND OF THE INVENTION

Technical Field

This disclosure relates to selecting telecommunications channels. More particularly, this disclosure relates to selecting a telecommunications channel based on the individual recipient and external factors.

Description of Related Art

Modern marketers want the ability to deliver personalized messages to their customers. They also desire the ability to select the optimal telecommunication channel(s) on which to deliver such marketing messages. Many marketing products allow a provider to determine the "Next Best Offer" (e.g., a discount, promotion, advertisement, etc.) for a consumer using a variety of intelligent heuristics. However, those marketing products do not provide the ability to determine the best outbound telecommunications channel(s) on which the marketing message should be served. As more and more channels become commonplace, and as new marketing telecommunications channels are added every year, determining the best telecommunications channel on which to serve offer content is becoming increasingly important.

SUMMARY

An approach is provided for selecting a telecommunications channel. In the approach, recipient attributes that correspond to an intended recipient are identified and current environment settings are retrieved. Predefined channel expression rules are then executed, with the channel expression rules utilizing the recipient attributes and the current environment settings as inputs to the rules. The execution of the channel expression rules results in the identification of a best telecommunications channel. A message is then transmitted to the intended recipient over the identified best telecommunications channel.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
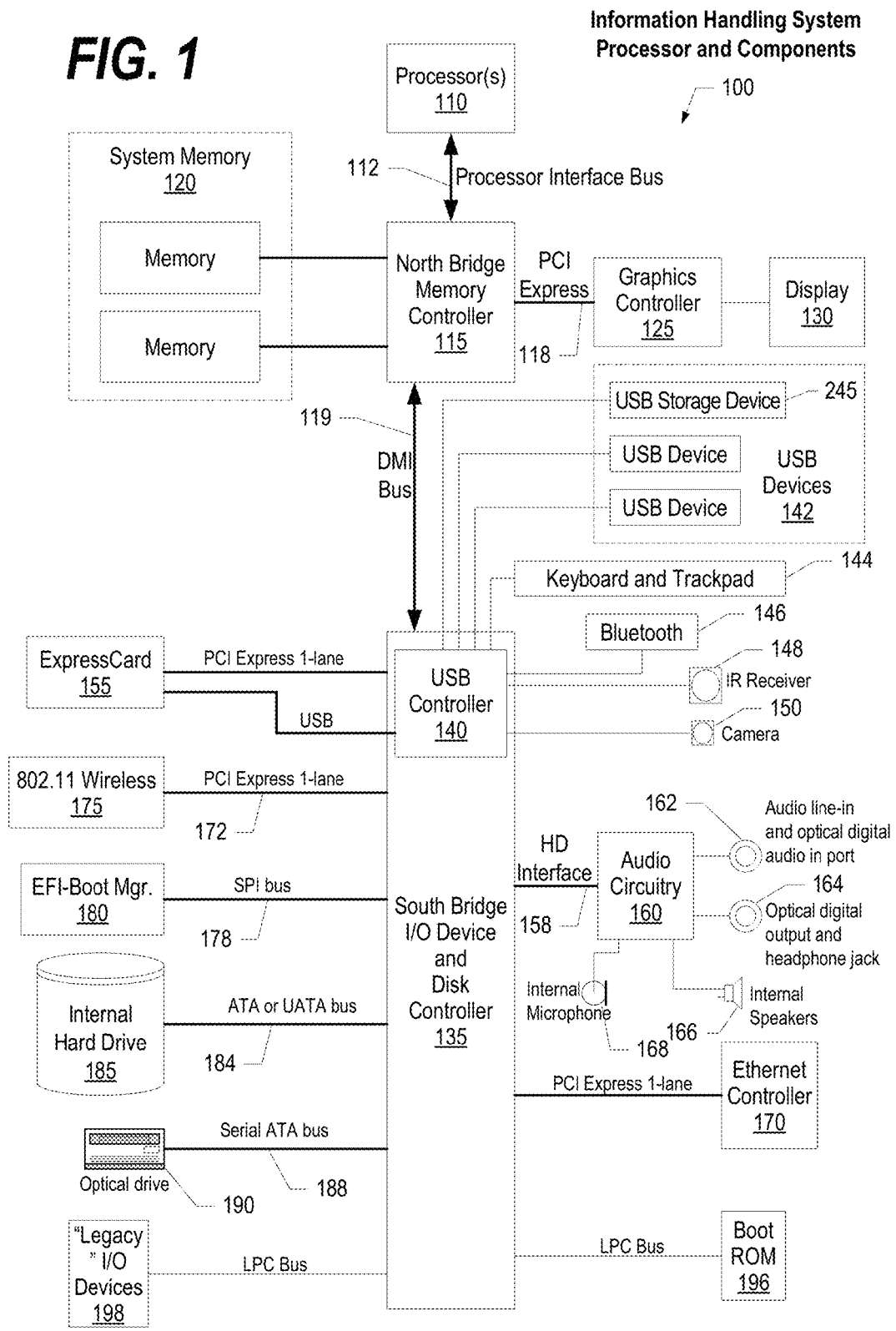
FIG. 1 depicts a block diagram of a processor and components of an information handling system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
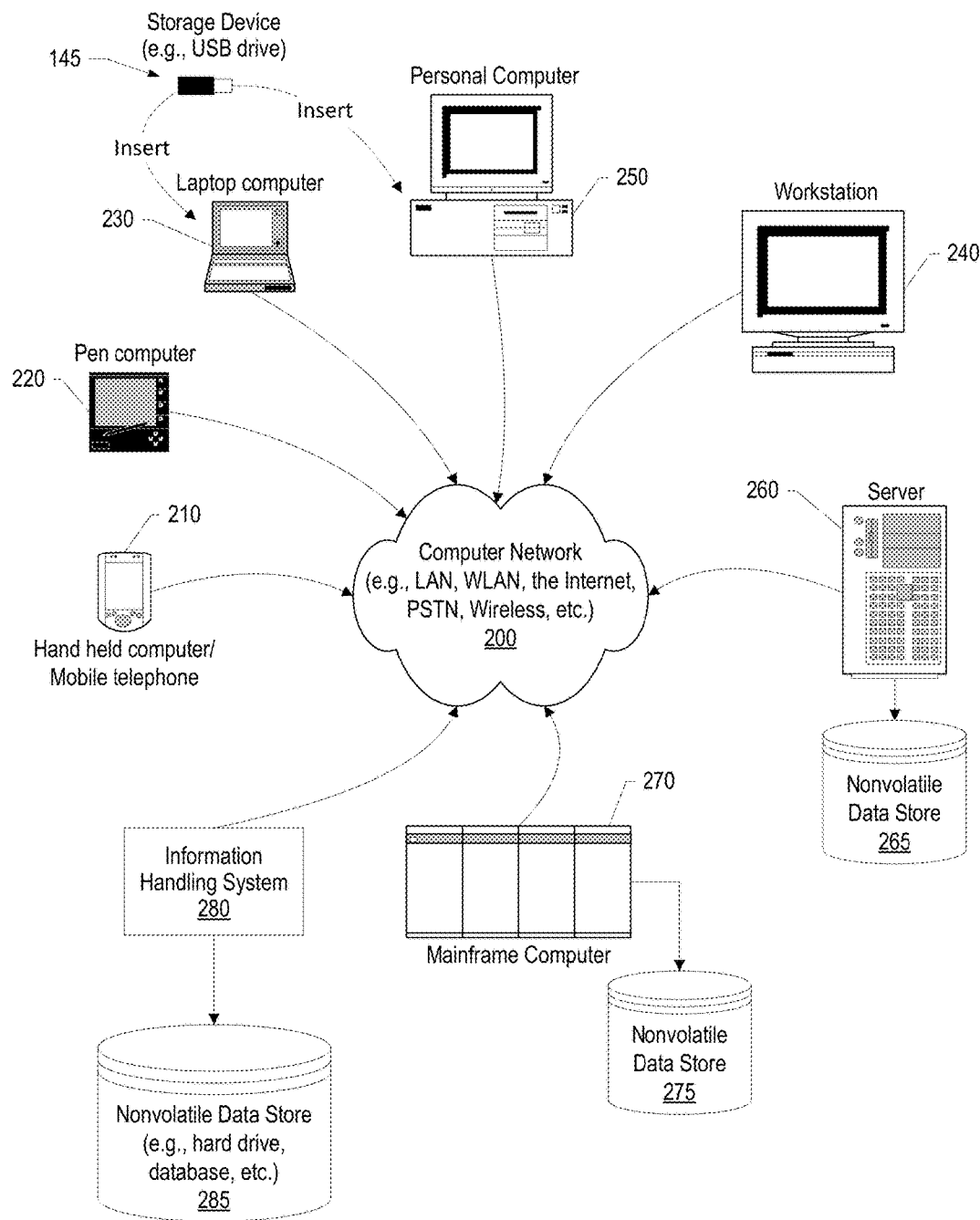
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-6 show an approach for selecting a telecommunications channel. As used herein, "telecommunications," includes any digital communications transmitted either via a wired system, a wireless system, or a system utilizing both wired and wireless components. In the approach, recipient attributes that correspond to an intended recipient are identified and current environment settings are retrieved. Predefined channel expression rules are then executed, with the channel expression rules utilizing the recipient attributes and the current environment settings as inputs to the rules. Attributes of the offer can also be utilized by the channel expression rules. The execution of the channel expression rules results in the identification of a best telecommunications channel. A message is then transmitted to the intended recipient over the identified best telecommunications channel. In one embodiment, the execution of the channel expression rules are performed in near-real-time so that the message (e.g., offer, etc.) can be transmitted to the recipient (customer) and received by the recipient shortly after the customer performed the activities that triggered the sending of the offer. If the conditions set forth in a channel expression are satisfied, then the channel (e.g., text message, email, message to website user, etc.) set forth in the channel expression is used to transmit the message, such as an offer, to the customer.

The approach described herein provides the ability to determine the "best telecommunications channel" for a given marketing message on an individual recipient basis. In today's modern digital world, a customer can be contacted via TV, billboards, direct marketing, phone, text message, email, mobile applications, web adds and more. While some people may view offers sent to them equally on any of these telecommunications channels, many people tune out marketing messages on some of these channels. This is often a personal preference, making the determination of the "Best Channel" for a given individual a non-trivial task. This approach allows the usage of algorithms to assist in the process of selecting the best channel(s) on which to deliver a given offer to an individual recipient. Marketers are able to use any of a recipient's known attributes, as well as attributes of the offer itself, to create an advanced expression condition to govern whether a channel is best for delivering a given offer to a specific recipient, and to do so in near real-time.

For example: suppose that Company A is about to send an offer to one of its customers (customer A-1). Before the offer is sent, the system consults a set of predefined channel expression rules (e.g., defined by company A's marketing department, consultants, etc.) that determine the channel that best serves the offer to customer A-1. In defining the rules, the marketer can compare any of customer-A-1's attributes to any other attribute or value. In addition, the rules can also compare customer attributes to attributes of the offer. A variety of functions and transformations can also be used in this rule definition. A trivial example might be as simple as just checking whether the system has the person's phone number before selecting SMS as the telecommunications channel. A slightly more advanced condition might be to recognize that it's very late at night for that person and the customer might be annoyed to receive a text message at 2 AM, so sending it on email is likely a better option. An extension to the rule might be to add a further condition that says it's acceptable to send a text message at 2 AM if the customer just performed an action on the company's website. Further predefined channel expression rules are shown and described herein.

Figure 3:
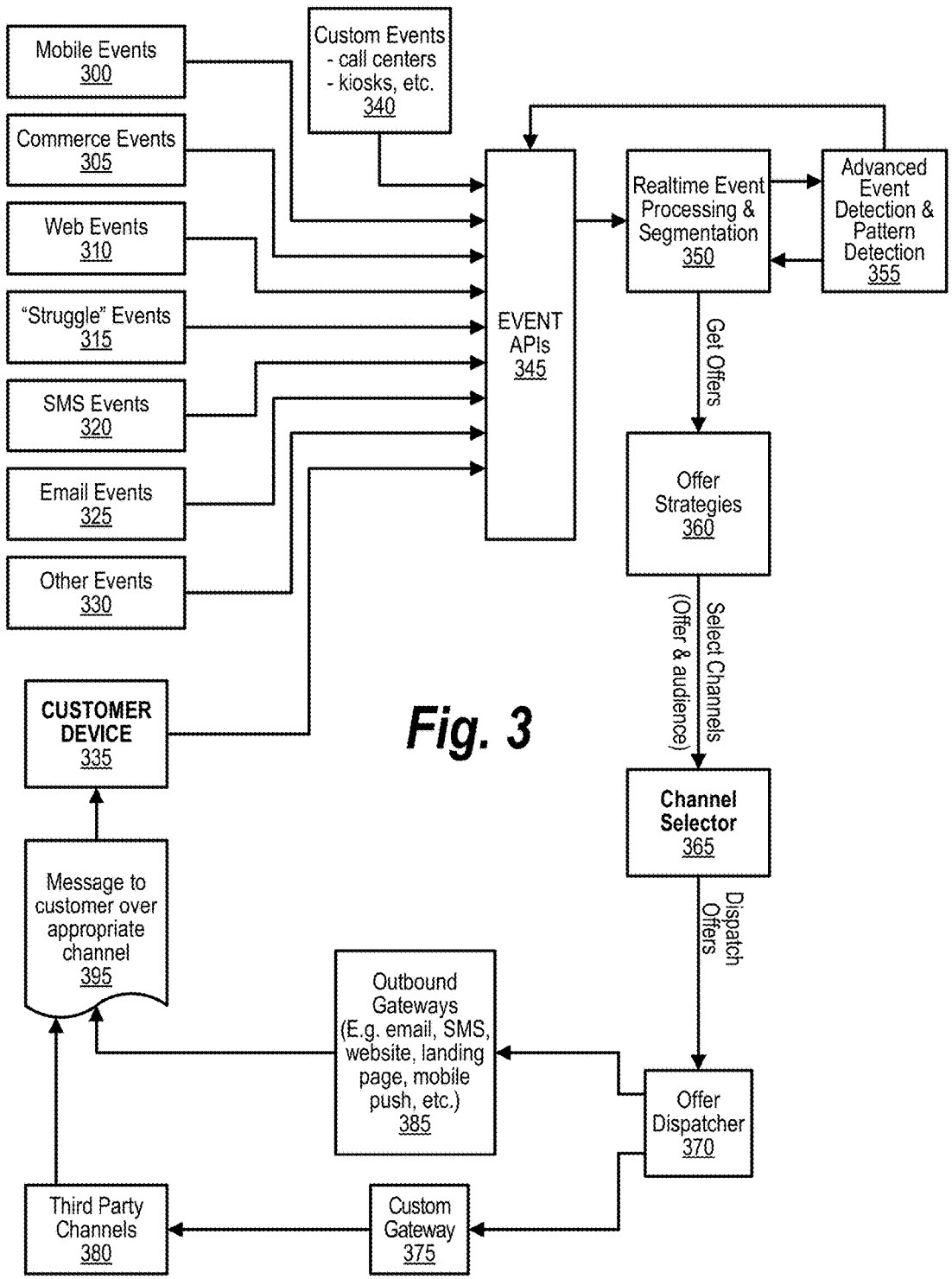
FIG. 3 is a component diagram depicting an exemplary environment utilizing a telecommunications channel selector.

FIG. 3 is a component diagram depicting an exemplary environment utilizing a telecommunications channel selector. In the environment shown, various events are used to trigger an offer being sent to a customer. These events include mobile events 300 (e.g., triggered from a customer's mobile device, etc.), commerce events 305, web events 310 (e.g., triggered from a customer's usage with the merchant's website, etc.), "struggle" events, such as a detection that a customer experienced some level of difficulty, or struggle, with the merchant's website or with a portion of the website (e.g., customer was unable to view product reviews by other customers, etc.), SMS (Short Message Service) events 320 (e.g., text messages, etc.), email events 325, and other events 330. In addition, custom events 340 are events triggered by other activities such as call centers, kiosks, store monitors, and the like.

Events are received by a processing system using event APIs (Application Programming Interfaces) 345. Each API provides a set of routines, protocols, and tools for handling the various types of events. Process 350 receives event inputs from the event APIs and performs realtime event processing and segmentation on the events. Process 355 receives results from the realtime event processing and segmentation process and performs advanced event detection and pattern detection. For example, multiple events may be combined by process 355 using advanced heuristics. For example, a trigger may be received that a customer is in a particular area of a store as well as a website trigger from the merchant's website that the customer is searching for a particular product.

Based on the processing performed by processes 350 and 355, an offer or other marketing message may be retrieved by process 360 that implement various offer strategies utilized by the merchant in communications with customers. If an offer was retrieved, process 365 performs the channel selector process that selects the best telecommunications channel to use with this particular customer in order to communicate the retrieved offer. In one embodiment, offer dispatcher 370 is used to dispatch the retrieved offer to the customer over the selected best telecommunications channel.

If a custom gateway is being used to communicate the offer, then offer dispatcher 370 transmits the offer to custom gateway 375 for transmission to the customer over the selected best the telecommunications channel. Custom gateway 375 then transmits the offer to the customer over a third party channel 380. If a custom gateway is not being used to communicate the offer, then offer dispatcher 370 transmits the offer to using outbound gateways 385 (e.g. email, SMS, website, landing page, mobile push, etc.). Message 395, such as a marketing message or other message with an offer from the merchant, is transmitted to customer device 335 over the selected best telecommunications channel.

Figure 4:
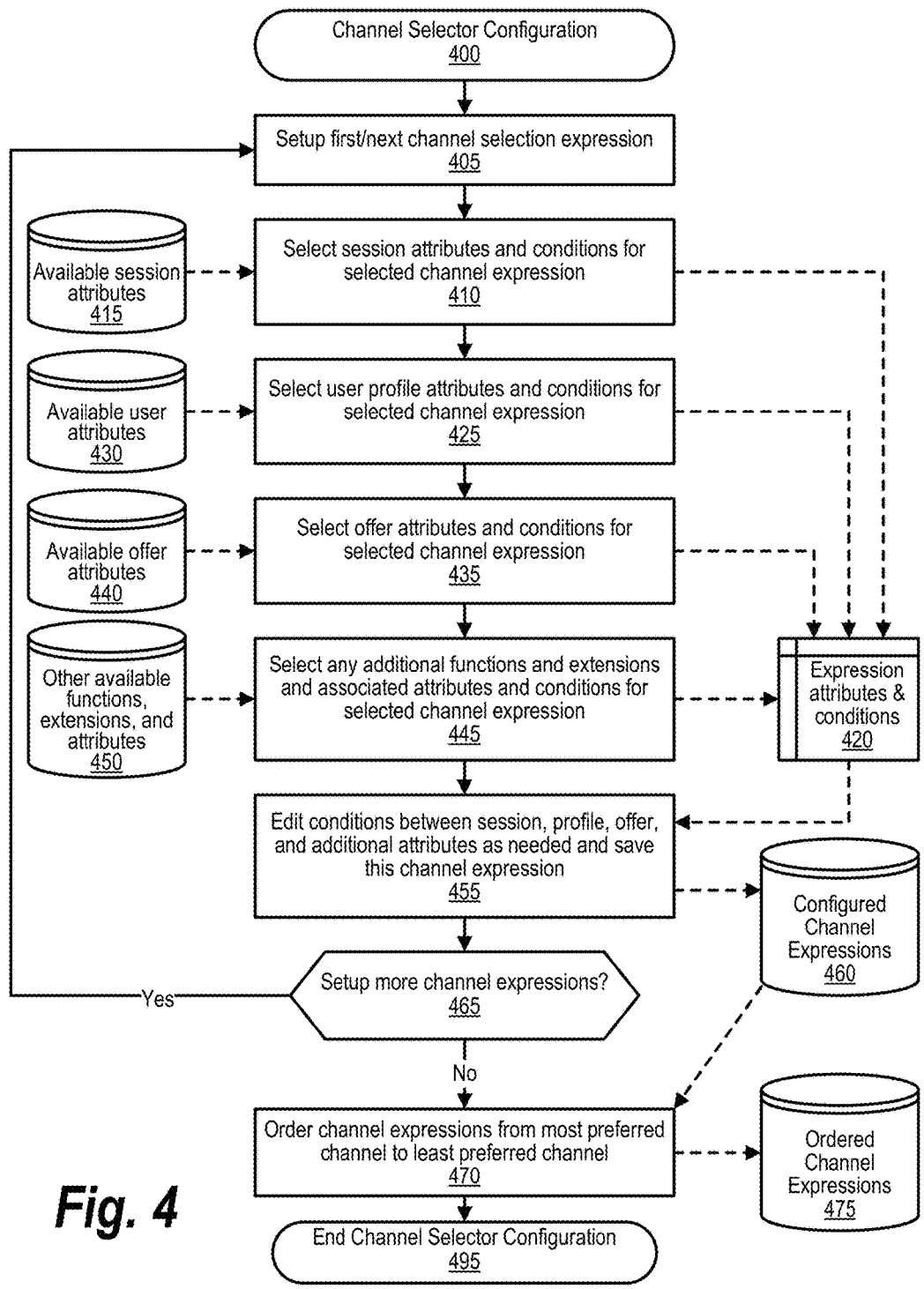
FIG. 4 is a flowchart showing configuration of the telecommunications channel selector.

FIG. 4 is a flowchart showing configuration of the telecommunications channel selector. FIG. 4 processing commences at 400 and shows the steps taken by a process that configures a channel selector that is used to select a telecommunications channel to use to send telecommunications to customers. At step 405, the process initiates setup of the first channel selection expression. At step 410, the session attributes and conditions for the selected channel expression are selected from available session attributes data store 415 and stores the selected session attributes and conditions in expression attributes and conditions memory area 420. A channel (e.g., text message, email, message to website user, etc.) is included in the channel expression with the channel being the technology used to transmit the message, such as an offer, to the customer.

At step 425, the user profile attributes and conditions are selected for the selected channel expression. The user profile attributes and conditions are selected from available user attributes data store 430 and the selected user profile attributes are stored in expression attributes and conditions memory area 420.

At step 435, offer attributes and conditions for the selected channel expression are selected from available offer attributes data store 440. The selected offer attributes and conditions are stored in expression attributes and conditions memory area 420.

At step 445, any additional functions and extensions and their associated attributes and conditions are selected for the selected channel expression are selected from other available functions, extensions, and attributes data store 450. The selected other available functions, extensions, and attributes data are stored in expression attributes and conditions memory area 420.

At step 455, the conditions between session, profile, offer, and additional attributes are retrieved from memory area 420 and edited as needed. The channel expression is stored in configured telecommunications channel expressions. The process determines as to whether more channel expressions are being setup (decision 465).

The following channel expression examples are provided to illustrate the flexibility of channel expressions. In the first example, a channel expression is formed to select SMS as the channel for a "20% Off coupon" for this recipient IF it's normal business hours in their time zone OR if a detection was made that the customer just struggled using the merchant's website when entering a promotion code three times in the last five minutes and the user has more than three abandoned shopping carts in the last year:

EXAMPLE 1

SMS=phonenumber != null && ((adjustTimeZone
(CURRENT_HOUR,profile.timezone) >= 9 && adjustTimeZone
(CURRENT_HOUR,profile.timezone) <= 17) || ((profile.
currentEventCode== struggledOnWebsiteEnteringPromoCode)
&&(count (profile.abandonedShoppingCartHistory) >3))

In the second example, a channel expression is formed to select the mobile push notification as the channel for a "40% Off coupon" for this recipient IF the customer is known to make more than $100,000 per year and the customer just installed and logged into our mobile app for the first time, after receiving and opened the "Install our new mobile app" email we sent last month:

EXAMPLE 2

```
mobilePushmobileId != null && (profile. incomeBracket >=
100000) && (profile. currentEventCode ==
installedOurMobileApp) && (profile.
openedMobileAppPromoEmail == true)
```

In the third example, a channel expression is formed to select the mobile push notification as the channel for delivering this offer (ie promotion) for this recipient IF they make more than the offer's income threshold and just installed and logged into our mobile app for the first time and did so after receiving and opening the "Install our new mobile app" email we sent last month.

EXAMPLE 3

Same as Example #2 Except with Income Threshold Obtained Generically from the Offer

```
mobilePush=mobileId != null &&
(profile.incomeBracket>=offer.incomeThreshhold) &&
(profile.currentEventCode==installedOurMobileApp) &&
(profile.openedMobileAppPromoEmail == true)
```

In the fourth example, a channel expression is formed to select email as the channel for delivering this offer (ie promotion) to this recipient IF within 5 minutes of leaving a store, the recipient makes a large purchase through the mobile app, where a large purchase is defined as a being more than 3 times the standard deviation of their past year's purchase history AND this offer's message body is too large to fit in one text message and EITHER the recipient's phone is an older model which displays large messages badly OR the recipient lives in a country where text messaging is expensive.

EXAMPLE 4

```
email=emailAddress != null && profile.currentEventCode==
"purchase" && profile.currentEventChannel= "MobileApp" &&
(profile.currentEventPurchaseAmount >
3*STDEV(profile.purchaseHistory)) && ((CURRENT_TIME -
profile.lastExitedStore) < 5*60*1000) &&
length(offer.messageBody) > 256 && (profile.phoneAge >
10 || in(profile.country, "Spain", "Belgium",
"Netherlands", "Norway", "Australia", "Switzerland"))
```

If more channel expressions are being setup, then decision 465 branches to the 'yes' branch which loops back to setup the next channel expression as described above. This looping continues until there are no more channel expressions to be setup, at which point decision 465 branches to the 'no' branch. In one embodiment, at step 470, the process orders, or sorts, the configured channel expressions from most the preferred channel to the least preferred channel. In this manner, if the attributes collected when a trigger occurs matches more than one channel expression, the first, or most preferred, channel expression will be selected and utilized.

The sorted channel expressions are stored in ordered channel expressions data store 475. Channel selector configuration processing thereafter ends at 495.

Figure 5:
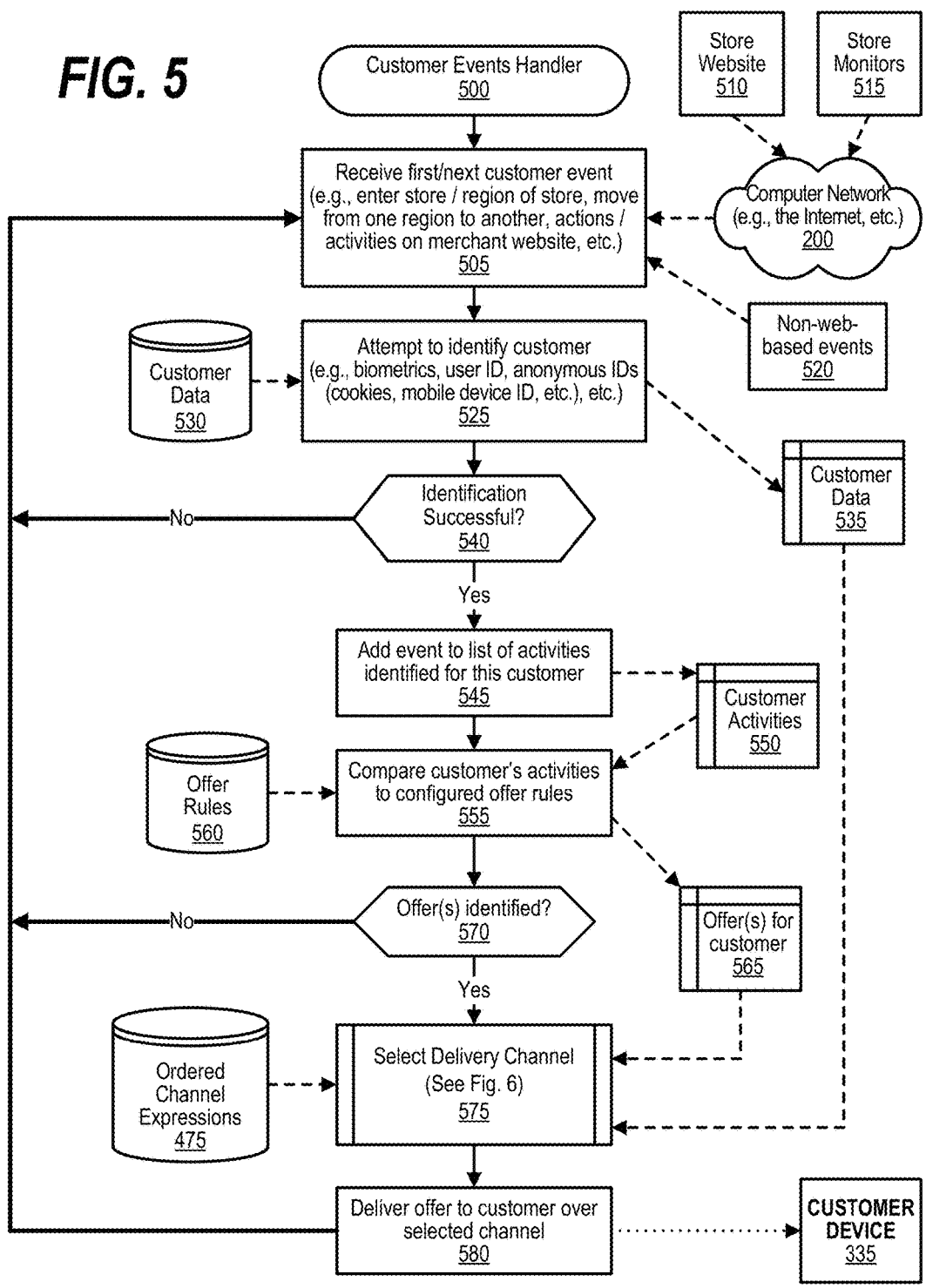
FIG. 5 is a flowchart showing steps taken handle customer events detected by a merchant or marketing provider.

FIG. 5 is a flowchart showing steps taken handle customer events detected by a merchant or marketing provider. FIG. 5 processing commences at 500 and shows the steps taken by a process that customer Events Handler. At step 505, the process receives the first customer event (e.g., customer enters store/a region of the store, customer moves from one region of the store to another, actions and activities performed using the merchant's website, etc.). For web-based events, step 505 receives the data from computer network 200, such as the Internet, with the data originating from either store website 510 or from store monitors 515. For non-web-based events, step 505 receives the data from non-web-based events 520.

At step 525, the process attempts to identify the customer corresponding to the triggered event using such tools and technologies as biometric data (e.g., camera images of the customer, etc.), the customer's user identifier if using the store's website, anonymous identifiers such as cookies, mobile device identifiers, and the like. Customer data is retrieved from data store 530. When a match is found, the matching customer data (e.g., customer profile data, customer identifier(s), customer channel contact identifiers, etc.) are retrieved and stored in memory area 535.

The process determines as to whether identification of the customer corresponding to the event was successful (decision 540). If identification of the customer corresponding to the event was successful, then decision 540 branches to the 'yes' branch to process any offers that the merchant may desire to present to the identified customer. On the other hand, if identification of the customer corresponding to the event was unsuccessful, then decision 540 branches to the 'no' branch bypassing the remaining steps and looping back to step 505 to receive the next customer event. Based on the type of telecommunications channel being used by the channel expression, personal identifiable information (PII) may or may not be needed. For example, if the channel expression provides an offer to the customer by sending a text message to the user's mobile telephone, then the user's identity would be needed to lookup the mobile telephone number that corresponds to the customer. On the other hand, if the channel expression provides an offer to a customer on the merchant's website, then the customer's PII is not needed and the anonymous address (e.g., IP address, etc.) corresponding to the customer when accessing the merchant's website can be used to transmit the offer to the customer.

At step 545, the process adds the detected event to a list of activities identified for this customer. The process stores the activities pertaining to a customer in memory area 550. Customer activities are collected and added to memory area 550 because a combination of events may initiate the sending of an offer to the customer rather than a single action or event.

At step 555, the process compares the collected customer's activities to the configured offer rules. The customer's collected activities are retrieved from memory area 550 and the configured offer rules are retrieved from offer rules data store 560. Offer(s) identified for the customer based on the customer's activities are stored in memory area 565.

The process determines as to whether the comparison performed at step 555 identified any offers for this customer based on the customer's activities (decision 565). If any offers have been identified for this customer, then decision 565 branches to the 'yes' branch for further processing. On the other hand, if no offers were identified for this customer, then decision 565 branches to the 'no' branch bypassing the remaining steps and looping back to step 505 to receive the next customer event.

Figure 6:
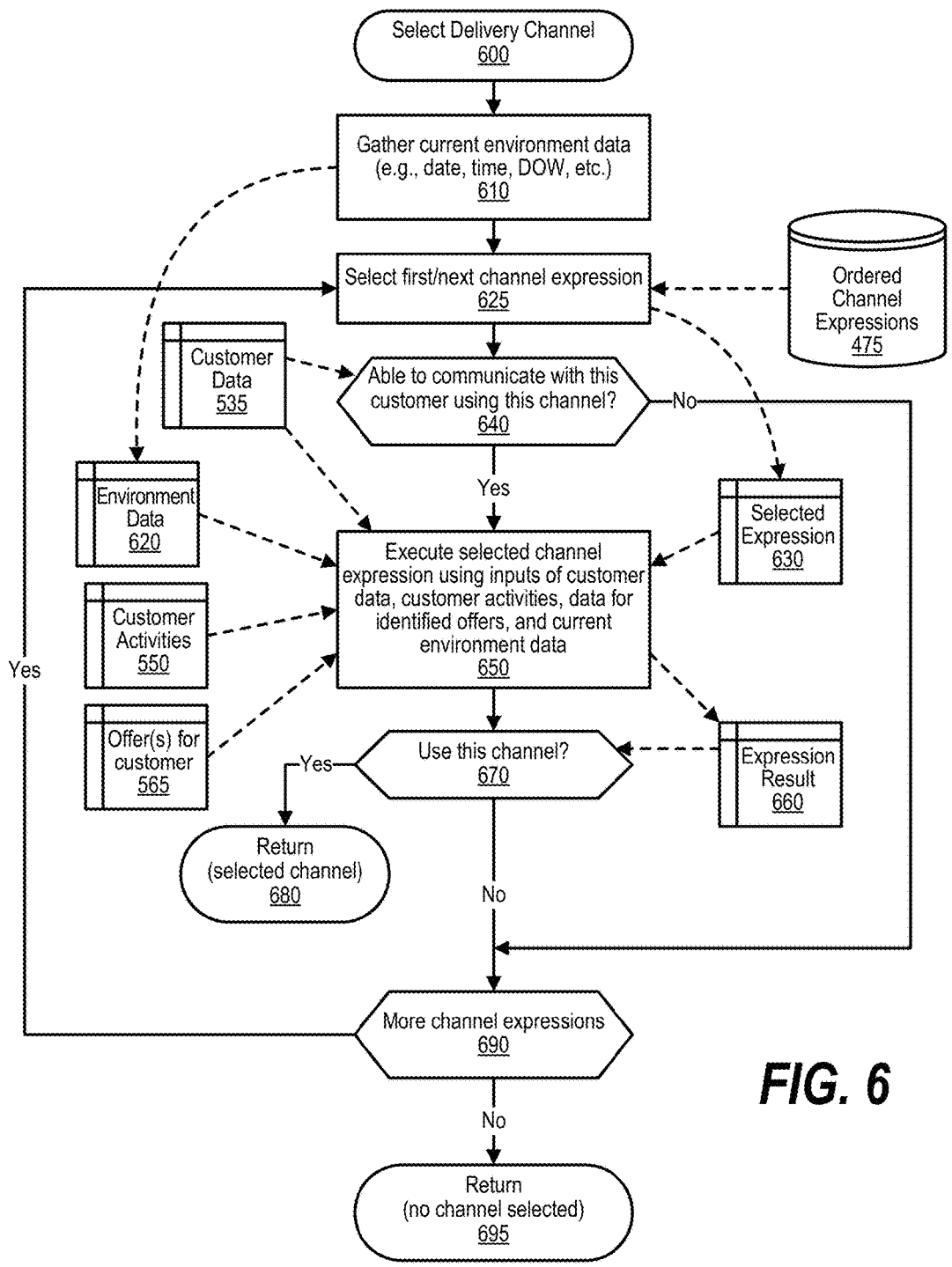
FIG. 6 is a flowchart showing steps taken to select a telecommunications channel based on the individual recipient being contacted.

At predefined process 575, the process performs the Select Delivery Channel routine (see FIG. 6 and corresponding text for processing details). The Select Delivery Channel identifies the best telecommunications channel to use to send this customer the offer by utilizing the channel expressions retrieved from data store 475, the customer data retrieved from memory area 535, and the identified offer(s) retrieved from memory area 565. When the conditions set forth in a channel expression are satisfied, then the telecommunications channel (e.g., text message, email, message to website user, etc.) set forth in the channel expression is used to transmit the message, such as an offer, to the customer. At step 580, the process delivers the offer to customer device 335 over the telecommunications channel that was selected by predefined process 575.

FIG. 6 is a flowchart showing steps taken to select a telecommunications channel based on the individual recipient being contacted. FIG. 6 processing commences at 600 and shows the steps taken by a process that selects the telecommunications channel for a given customer.

At step 610, the process gathers current environment data such as the current date, time, day of week, and the like. Step 610 stores the gathered environment data in memory area 620. At step 625, the process selects the first channel expression. The channel expressions are retrieved from ordered channel expressions data store 475. The selected channel expression is stored in memory area 630.

The process determines as to whether the process is able to send a message to this customer using the channel in the channel expression (decision 640). For example, if the first channel expression uses SMS to send a text message to the customer but the customer data does not include the customer's SMS contact data (e.g., mobile phone number, etc.), then a different channel (e.g., email, etc.) is needed. If the process is able to communicate with this customer using the channel included in the selected channel expression, then decision 640 branches to the 'yes' branch for further processing. On the other hand, if the process is not able to communicate with this customer using this channel, then decision 640 branches to the 'no' branch which bypasses steps 650 through 680.

At step 650, the process executes selected channel expression using inputs of customer data, customer activities, data for identified offers, and current environment data. Step 650 retrieves the environment data from memory area 620, the customer data from memory area 535, the customer's activities from memory area 550, the offer from memory area 565, and the selected channel expression from memory area 630. The result from executing the channel expression using the various inputs is stored in memory area 660. In one embodiment, the expression result is a Boolean value (e.g., '1' (TRUE) or '0' (FALSE), etc.) that indicates whether the channel expression corresponds to a channel that can be used given the various inputs. Because the channel expressions in data store 475 are sorted in preferred order, the first channel expression that can be used (results in a '1' or 'TRUE' value) is the channel expression, and telecommunications channel, that is selected.

Based on the result of executing the channel expression, the process determines as to whether to use this channel (decision 670). If the channel result indicated that this channel is the best telecommunications channel to use with this customer, then decision 670 branches to the 'yes' branch whereupon processing returns to the calling routine (see FIG. 5) at 680. On the other hand, the result of executing the channel expression indicated that this channel should not be selected, then decision 670 branches to the 'no' branch and processing continues.

The process determines as to whether there are more channel expressions available for execution (decision 690). If there are more channel expressions available for execution, then decision 690 branches to the 'yes' branch which loops back to step 625 to select and execute the next channel expression as described above. This looping continues until either a suitable channel expression is found (with decision 670 branching to 'yes' branch) or there are no more channel expressions to execute, at which point decision 690 branches to the 'no' branch exiting the loop and processing returns to the calling routine (see FIG. 5) at 695 with a return code indicating that a suitable channel was not identified for this customer.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising one or more processors and a memory, of selecting a telecommunications channel, the method comprising:
configuring a plurality of channel expression rules;
determining an ordering of the plurality of channel expression rules from a most preferred telecommunications channel to a least preferred telecommunications channel;
detecting an event initiated by an intended recipient;
identifying the intended recipient, wherein the identifying further comprises identifying one or more recipient attributes corresponding to the intended recipient;
identifying an offer for the intended recipient based on the detected event;
executing one or more of the plurality of channel expression rules according to the determined ordering, wherein the executing utilizes one or more of the recipient attributes and one or more offer attributes corresponding to the identified offer as inputs to the channel expression rules, and wherein the executing identifies a best telecommunications channel; and
transmitting a message to the intended recipient over the identified best telecommunications channel.

2. The method of claim 1 further comprising:
matching one or more detected attributes associated with the intended recipient with a plurality of known attributes associated with a plurality of previously identified customers, the matching resulting in a selected one of the previously identified customers; and
retrieving one or more telecommunication identifiers associated with the intended recipient, wherein the intended recipient is the selected identified customer, wherein the executing of the channel expression rules is in near real-time to the detection of the event.

3. The method of claim 2 wherein the detected event is selected from a group consisting of detecting that the intended recipient enters a store, detecting that the intended recipient enters a region of the store, detecting that the intended recipient physically moves from a first region of the store to a second region of the store, detecting that the intended recipient physically leaves the store, detecting that the intended recipient physically leaves a region of the store, detecting that the intended recipient purchases one or more items at the store, detecting that the intended recipient performs certain activities on a merchant's website, detecting that the intended recipient purchases one or more items at the merchant's website, and detecting that the intended recipient experiences difficulties while using the merchant's website.

4. The method of claim 2 wherein the telecommunication identifiers are selected from a group consisting of the intended recipient's email address, the intended recipient's telephone number, the intended recipient's mobile telephone number, and the intended recipient's social media identifier.

5. The method of claim 1 further comprising:
retrieving one or more current environment settings, wherein the executing further comprises utilizing the current environment settings as further inputs to the channel expression rules.

6. The method of claim 1 further comprising:
formatting the message based on the identified best telecommunications channel wherein the message is a marketing message; and
sending the identified best telecommunications channel and the offer to a message dispatcher that transmits the message to the intended recipient over the identified best telecommunications channel.

7. An information handling system comprising:
one or more processors;
a memory coupled to at least one of the processors;
a telecommunications adapter, accessible by at least one of the processors; and
a set of instructions stored in the memory and executed by at least one of the processors to select a telecommunications channel to use with the telecommunications adapter, wherein the set of instructions perform actions of:
configuring a plurality of channel expression rules;
determining an ordering of the plurality of channel expression rules from a most preferred telecommunications channel to a least preferred telecommunications channel;
detecting an event initiated by an intended recipient;
identifying the intended recipient, wherein the identifying further comprises identifying one or more recipient attributes corresponding to the intended recipient;
executing one or more of the plurality of channel expression rules according to the determined ordering, wherein the executing utilizes one or more of the recipient attributes and one or more offer attributes corresponding to the identified offer as inputs, and wherein the executing identifies a best telecommunications channel; and
transmitting, via the telecommunications adapter, a message to the intended recipient over the identified best telecommunications channel.

8. The information handling system of claim 7 wherein the actions further comprise:
matching one or more detected attributes associated with the intended recipient with a plurality of known attributes associated with a plurality of previously identified customers, the matching resulting in a selected one of the previously identified customers; and
retrieving one or more telecommunication identifiers associated with the intended recipient, wherein the intended recipient is the selected identified customer, wherein the executing of the channel expression rules is in near real-time to the detection of the event.

9. The information handling system of claim 8 wherein the detected event is selected from a group consisting of detecting that the intended recipient enters a store, detecting that the intended recipient enters a region of the store, detecting that the intended recipient physically moves from a first region of the store to a second region of the store, detecting that the intended recipient physically leaves the store, detecting that the intended recipient physically leaves a region of the store, detecting that the intended recipient purchases one or more items at the store, detecting that the intended recipient performs certain activities on a merchant's website, detecting that the intended recipient purchases one or more items at the merchant's website, and detecting that the intended recipient experiences difficulties while using the merchant's website.

10. The information handling system of claim 8 wherein the telecommunication identifiers are selected from a group consisting of the intended recipient's email address, the intended recipient's telephone number, the intended recipient's mobile telephone number, and the intended recipient's social media identifier.

11. The information handling system of claim 7 wherein the actions further comprise:
retrieving one or more current environment settings, wherein the executing further comprises utilizing the current environment settings as further inputs to the channel expression rules.

12. The information handling system of claim 7 wherein the actions further comprise:
formatting the message based on the identified best telecommunications channel wherein the message is a marketing message; and
sending the identified best telecommunications channel and the offer to a message dispatcher that transmits the message to the intended recipient over the identified best telecommunications channel.

13. A computer program product stored in a computer readable storage device, comprising computer instructions that, when executed by an information handling system, causes the information handling system to abstract crowd sourced data by performing actions comprising:
configuring a plurality of channel expression rules;
determining an ordering of the plurality of channel expression rules from a most preferred telecommunications channel to a least preferred telecommunications channel;
detecting an event initiated by an intended recipient;

identifying the intended recipient, wherein the identifying further comprises identifying one or more recipient attributes corresponding to the intended recipient;

executing one or more of the plurality of channel expression rules according to the determined ordering, wherein the executing utilizes one or more of the recipient attributes and one or more offer attributes corresponding to the identified offer as inputs, and wherein the executing identifies a best telecommunications channel; and transmitting a message to the intended recipient over the identified best telecommunications channel.

14. The computer program product of claim 13 wherein the actions further comprise:

matching one or more detected attributes associated with the intended recipient with a plurality of known attributes associated with a plurality of previously identified customers, the matching resulting in a selected one of the previously identified customers; and retrieving one or more telecommunication identifiers associated with the intended recipient, wherein the intended recipient is the selected identified customer, wherein the executing of the channel expression rules is in near real-time to the detection of the event.

15. The computer program product of claim 14 wherein the detected event is selected from a group consisting of detecting that the intended recipient enters a store, detecting that the intended recipient enters a region of the store, detecting that the intended recipient physically moves from a first region of the store to a second region of the store, detecting that the intended recipient physically leaves the store, detecting that the intended recipient physically leaves a region of the store, detecting that the intended recipient purchases one or more items at the store, detecting that the intended recipient performs certain activities on a merchant's website, detecting that the intended recipient purchases one or more items at the merchant's website, and detecting that the intended recipient experiences difficulties while using the merchant's website.

16. The computer program product of claim 14 wherein the telecommunication identifiers are selected from a group consisting of the intended recipient's email address, the intended recipient's telephone number, the intended recipient's mobile telephone number, and the intended recipient's social media identifier.

17. The computer program product of claim 13 wherein the actions further comprise:

retrieving one or more current environment settings, wherein the executing further comprises utilizing the current environment settings as further inputs to the channel expression rules.

18. The method of claim 1 further comprising:

adding the event to a list of activities corresponding to the intended recipient, wherein the identified offer is based on the list of activities for the intended recipient.

19. The information handling system of claim 7 wherein the actions further comprise:

adding the event to a list of activities corresponding to the intended recipient, wherein the identified offer is based on the list of activities for the intended recipient.

20. The computer program product of claim 13 wherein the actions further comprise:

adding the event to a list of activities corresponding to the intended recipient, wherein the identified offer is based on the list of activities for the intended recipient.

* * * * *